US010609185B2

(12) United States Patent
Bliss et al.

(10) Patent No.: US 10,609,185 B2
(45) Date of Patent: Mar. 31, 2020

(54) METHOD FOR TOPOLOGY TREE TO LEARN ABOUT, PRESENT, AND CONFIGURE DEVICE INFORMATION BY AUTOMATICALLY UPLOADING DEVICE DESCRIPTION FILES FROM DEVICE

(71) Applicant: Rockwell Automation Technologies, Inc., Mayfield Heights, OH (US)

(72) Inventors: Ronald E. Bliss, Twinsburg, OH (US); Yunpu Zhao, Dalian (CN); Chengquan Shi, Dalian (CN); Fabio Malaspina, Twinsburg, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 332 days.

(21) Appl. No.: 15/342,184

(22) Filed: Nov. 3, 2016

(65) Prior Publication Data
US 2017/0126841 A1 May 4, 2017

Related U.S. Application Data

(60) Provisional application No. 62/250,562, filed on Nov. 4, 2015.

(51) Int. Cl.
*G06F 15/16* (2006.01)
*H04L 29/08* (2006.01)
(Continued)

(52) U.S. Cl.
CPC .......... *H04L 67/34* (2013.01); *G05B 19/0423* (2013.01); *G06F 3/0481* (2013.01);
(Continued)

(58) Field of Classification Search
CPC ...... G05B 2219/31422; G05B 19/0423; G05B 2219/23258; G05B 2219/25066;
(Continued)

(56) References Cited

U.S. PATENT DOCUMENTS 5,923,663 A * 7/1999 Bontemps ......... H04L 12/40169
370/445
5,987,516 A * 11/1999 Rao ........................ H04L 41/00
709/223
(Continued)

FOREIGN PATENT DOCUMENTS

EP 2653941 10/2013
WO 03029907 4/2003

OTHER PUBLICATIONS

EP Search Report for PCT Application Serial No. 16197230.2, dated Mar. 7, 2017, 8 pages.

*Primary Examiner* — Imad Hussain
(74) *Attorney, Agent, or Firm* — Amin, Turocy & Watson, LLP

(57) ABSTRACT

A communications application that acts as a data server between one or more industrial devices and a client-side application is capable of detecting and uploading device description files from the industrial devices themselves. Upon discovery of an industrial device communicatively connected to a client device's communication port, the communications application determines whether a device description file for the discovered device is registered. If no device description file is registered for the industrial device, or if the discovered file is newer than a previously registered file, the communications application initiates an upload of the device description file from the industrial device if the file is stored on the device. Upon completion of the upload, the device description file is registered, thereby allowing the communications application to display information about the device and to manage data exchange between the industrial device and the client-side application.

23 Claims, 13 Drawing Sheets

(51) Int. Cl.
*G05B 19/042* (2006.01)
*G06F 3/0481* (2013.01)
*G06F 3/0482* (2013.01)
*H04L 12/24* (2006.01)
*H04L 29/06* (2006.01)

(52) U.S. Cl.
CPC ........ *G06F 3/0482* (2013.01); *G06F 3/04817* (2013.01); *H04L 41/12* (2013.01); *H04L 67/12* (2013.01); *G05B 2219/23258* (2013.01); *G05B 2219/25066* (2013.01); *G05B 2219/32142* (2013.01); *H04L 67/42* (2013.01)

(58) Field of Classification Search
CPC ...... G05B 2219/32142; H04L 12/2803; H04L 67/34; H04L 41/082; H04L 41/0803; H04L 41/0856; H04L 41/0866; H04L 41/12; H04L 67/42; H04L 67/12; G06F 9/4411; G06F 3/038; G06F 3/0481; G06F 3/04817; G06F 3/0482
USPC .......................................................... 709/217
See application file for complete search history.

(56) References Cited

U.S. PATENT DOCUMENTS

| | | | | |
|---|---|---|---|---|
| 6,105,065 | A * | 8/2000 | Rao | H04L 41/0213 709/205 |
| 6,523,124 | B1 * | 2/2003 | Lunsford | G06F 1/1613 713/320 |
| 6,801,507 | B1 * | 10/2004 | Humpleman | H04L 12/40117 370/252 |
| 7,200,683 | B1 * | 4/2007 | Wang | H04L 12/2803 709/250 |
| 7,659,940 | B2 * | 2/2010 | Stahl | H04B 1/205 348/552 |
| 7,730,428 | B1 * | 6/2010 | Yehuda | G06F 3/0605 715/853 |
| 8,677,013 | B2 | 3/2014 | VanGompel | |
| 2001/0034754 | A1 * | 10/2001 | Elwahab | H04L 12/2803 709/201 |
| 2001/0042118 | A1 * | 11/2001 | Miyake | H04L 41/12 709/223 |
| 2002/0029256 | A1 * | 3/2002 | Zintel | H04L 12/2803 709/218 |
| 2002/0035621 | A1 * | 3/2002 | Zintel | H04L 12/2805 709/220 |
| 2003/0001883 | A1 * | 1/2003 | Wang | G06F 3/0481 715/736 |
| 2003/0093426 | A1 * | 5/2003 | Peter | H04L 41/0213 |
| 2005/0251568 | A1 * | 11/2005 | Zavgren, Jr. | H04L 41/12 709/223 |
| 2005/0257204 | A1 * | 11/2005 | Bryant | G06F 3/0481 717/163 |
| 2005/0267935 | A1 * | 12/2005 | Gandhi | H04L 29/1232 709/203 |
| 2006/0069452 | A1 * | 3/2006 | Pfister | H04L 41/0803 700/18 |
| 2006/0069459 | A1 * | 3/2006 | Retlich | G05B 23/0216 700/108 |
| 2006/0120316 | A1 * | 6/2006 | Von Stein | G05B 19/042 370/315 |
| 2006/0224250 | A1 * | 10/2006 | Callaghan | G05B 19/054 700/1 |
| 2006/0272024 | A1 * | 11/2006 | Huang | G06F 21/55 726/26 |
| 2006/0291412 | A1 * | 12/2006 | Naqvi | H04M 7/123 370/328 |
| 2006/0294244 | A1 * | 12/2006 | Naqvi | H04M 7/123 709/227 |
| 2007/0189486 | A1 * | 8/2007 | Ise | H04L 29/1249 379/201.12 |
| 2007/0190939 | A1 * | 8/2007 | Abel | H04B 5/0031 455/41.2 |
| 2008/0008444 | A1 * | 1/2008 | Hori | G11B 27/11 386/291 |
| 2008/0065243 | A1 * | 3/2008 | Fallman | G05B 19/409 700/83 |
| 2008/0077512 | A1 * | 3/2008 | Grewal | G05B 19/05 705/28 |
| 2008/0148191 | A1 * | 6/2008 | Weinlander | G06F 3/0482 715/854 |
| 2008/0234837 | A1 * | 9/2008 | Samudrala | G05B 19/042 700/19 |
| 2008/0275940 | A1 * | 11/2008 | Yamada | H04L 63/0263 709/203 |
| 2009/0055648 | A1 * | 2/2009 | Kim | H04L 63/06 713/171 |
| 2009/0326684 | A1 * | 12/2009 | Wang | H04L 12/2809 700/83 |
| 2011/0004914 | A1 * | 1/2011 | Ennis, Jr. | H04L 41/0853 726/1 |
| 2011/0230980 | A1 * | 9/2011 | Hammack | G05B 19/409 700/17 |
| 2012/0093242 | A1 * | 4/2012 | Wallace | G05B 19/042 375/259 |
| 2013/0212160 | A1 * | 8/2013 | Lawson | G05B 19/4185 709/203 |
| 2013/0254668 | A1 * | 9/2013 | Davis | G05B 19/0423 715/738 |
| 2014/0380177 | A1 * | 12/2014 | Gutermuth | G05B 19/0423 715/736 |
| 2015/0067671 | A1 * | 3/2015 | Kamiya | G06F 8/61 717/174 |
| 2015/0120062 | A1 * | 4/2015 | McKinzie | G05B 15/02 700/275 |
| 2015/0131645 | A1 * | 5/2015 | Reunamaki | H04W 4/80 370/350 |
| 2015/0143268 | A1 * | 5/2015 | Retlich | G05B 23/0216 715/763 |
| 2015/0277399 | A1 * | 10/2015 | Maturana | G06F 9/5072 700/29 |
| 2016/0099845 | A1 * | 4/2016 | Murase | H04L 41/12 715/736 |
| 2016/0132538 | A1 * | 5/2016 | Bliss | G05B 19/41855 707/741 |
| 2016/0182285 | A1 * | 6/2016 | Ferguson | H04L 67/34 709/228 |
| 2016/0274553 | A1 * | 9/2016 | Strohmenger | G05B 19/41885 |
| 2016/0292895 | A1 * | 10/2016 | Billi | G06T 11/60 |
| 2017/0214717 | A1 * | 7/2017 | Bush | H04L 63/107 |
| 2018/0060058 | A1 * | 3/2018 | Collins | G06F 8/65 |

* cited by examiner

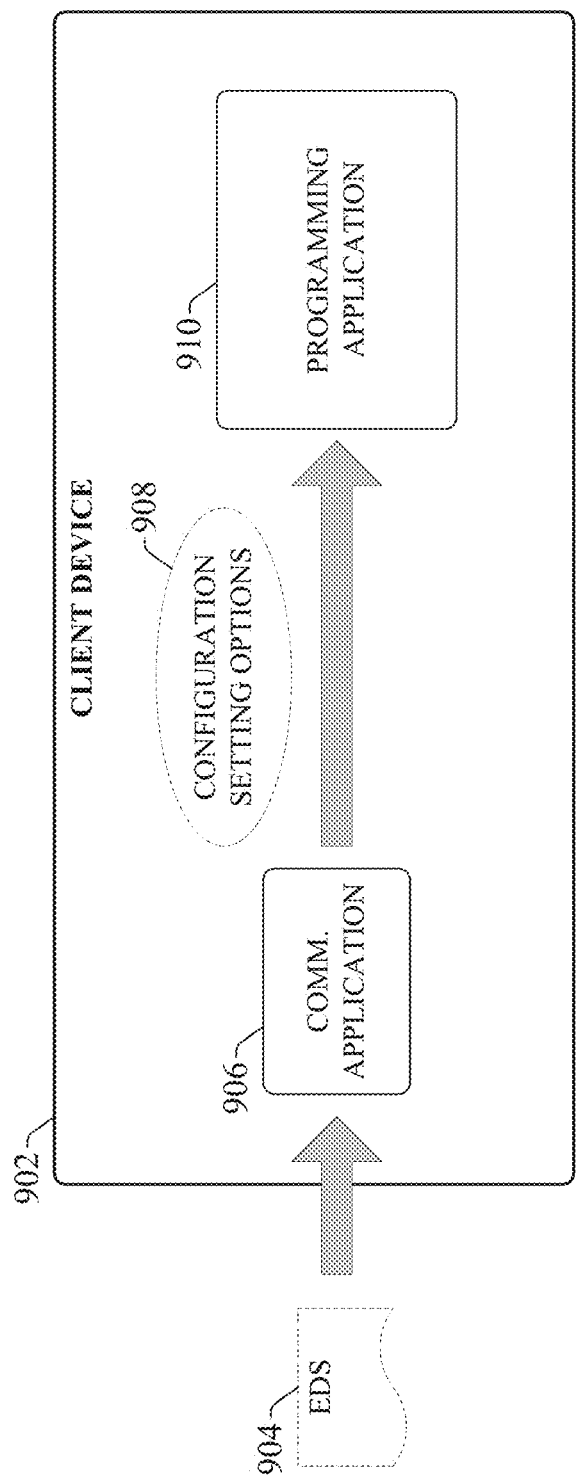

METHOD FOR TOPOLOGY TREE TO LEARN ABOUT, PRESENT, AND CONFIGURE DEVICE INFORMATION BY AUTOMATICALLY UPLOADING DEVICE DESCRIPTION FILES FROM DEVICE

CROSS-REFERENCE TO RELATED APPLICATIONS

This application claims priority to U.S. Provisional Application Ser. No. 62/250,562, filed on Nov. 4, 2015, and entitled "METHOD FOR TOPOLOGY TREE TO LEARN ABOUT, PRESENT, AND CONFIGURE DEVICE INFORMATION BY AUTOMATICALLY UPLOADING DEVICE DESCRIPTION FILES FROM DEVICE," the entirety of which is incorporated herein by reference.

BACKGROUND

The subject matter disclosed herein relates generally to industrial automation systems, and, more particularly, to a communications application capable of uploading and registering device description files from an industrial device for registration.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system is provided, comprising a communication component configured to exchange data with an industrial device via a communication port; a device discovery component configured to detect the industrial device as being communicatively connected to the communication port, and to determine whether a device description file for the industrial device has been registered with the system; and a device description file discovery component configured to, in response to a determination that the device description file has not been registered, initiate an upload of the device description file from the industrial device via the communication port.

Also, one or more embodiments provide a method, comprising detecting, by a system comprising at least one processor, that an industrial device is communicatively connected to a communication port of a client device; determining, by the system and in response to the detecting, that a device description file for the industrial device is not registered with the system; sending, by the system and in response to the determining, a request to the industrial device via the communication port for the device description file; and initiating, by the system, an upload of the device description file from the industrial device via the communication port in response to receipt of a confirmation from the industrial device that the device description file is stored on the industrial device.

Also, according to one or more embodiments, a non-transitory computer-readable medium is provided having stored thereon instructions that, in response to execution, cause a system to perform operations, the operations comprising detecting that an industrial device is communicatively connected to a communication port of a client device; in response to the detecting, determining whether device description information for the industrial device is registered with the system; and in response to determining that the device description information is not registered with the system: sending a request for the device description information to the industrial device via the communication port, and initiating an upload of the device description information from the industrial device via the communication port in response to receiving a message from the industrial device that device description information is stored on the industrial device.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 9 is a diagram depicting communication of device configuration setting options from a communications application to a client application executing on client device.

DETAILED DESCRIPTION

Figure 1:
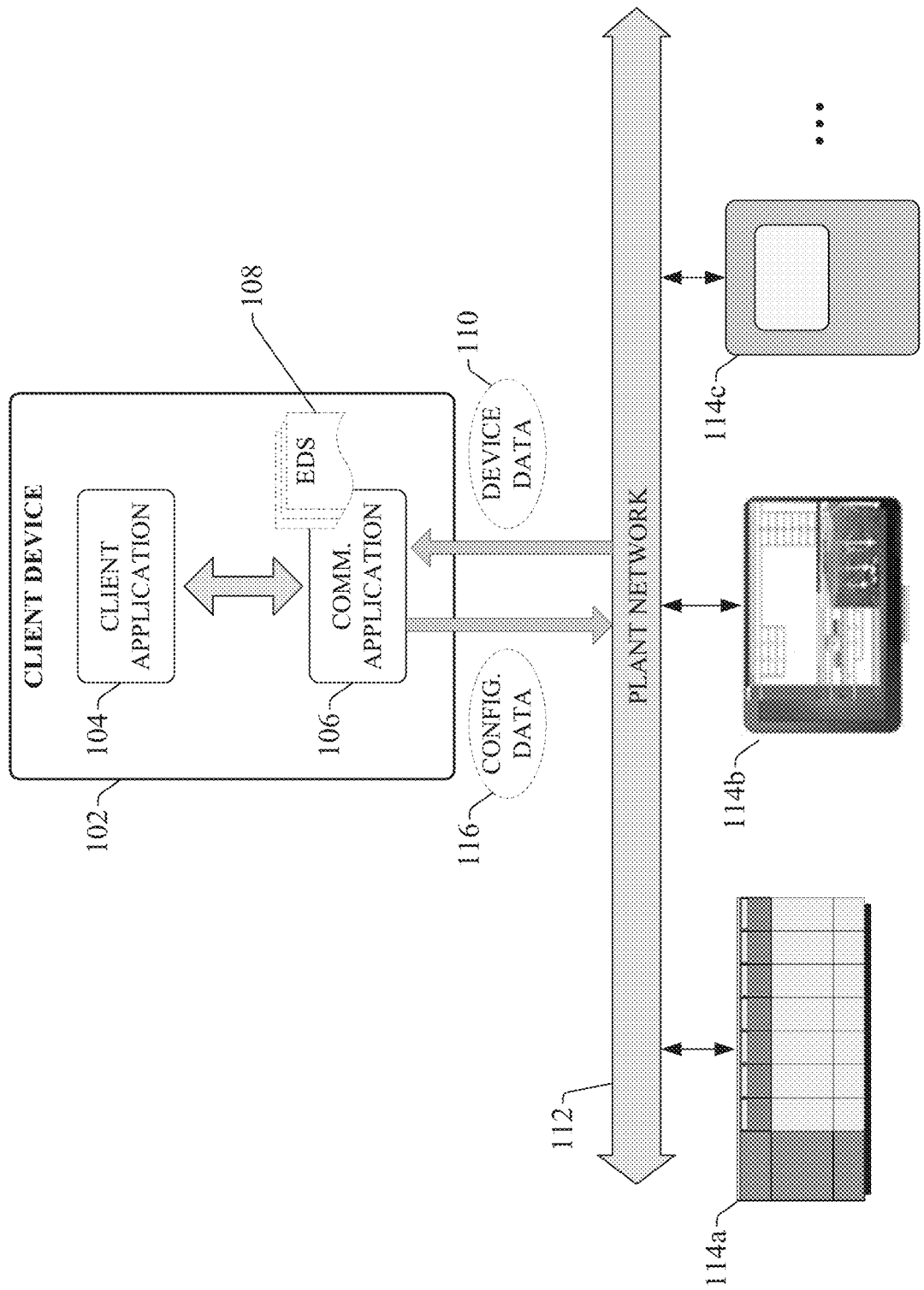
FIG. 1 is a diagram of an example industrial control environment in which a client device executes a client application that communicates with one or more industrial devices.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Modern industrial enterprises are reliant on a large number of industrial device that are crucial to the manufacturing and financial goals of the enterprise. These industrial devices include, but are not limited to, industrial controllers that are deployed throughout an industrial plant environment and configured to monitor and control respective industrial systems or processes relating to product manufacture, machining, motion control, batch processing, material handling, or other such industrial functions. Industrial controllers typically execute respective control programs to facilitate monitoring and control of industrial I/O devices making up the controlled industrial systems. The control programs executed by the industrial controllers can comprise any conceivable type of code used to process input signals read from the industrial I/O devices and to control output signals generated by the industrial controllers, including but not limited to ladder logic, sequential function charts, function block diagrams, or structured text.

Other industrial devices include input devices that provide data relating to the controlled industrial systems to the industrial controllers (e.g., meters or other such telemetry devices), and output devices that respond to control signals generated by the industrial controllers to control aspects of the industrial systems. Industrial automation systems that include motion systems may also include motor drives (e.g., variable frequency drives, servo drives, or other types of motor drives), which control the velocity and/or position of a motor either autonomously or under the control of an industrial controller. Other industrial devices can include industrial robots, peripheral systems or devices that participate in machine control or quality verification processes (e.g., vision systems, quality check systems, industrial safety systems, motor drives, etc.), and other such industrial devices.

Many industrial devices deployed throughout an industrial environment generate and/or store data that may be useful to external client applications. For example, an industrial controller maintains operational and status data relating to an industrial process or machines being monitored and controlled by the industrial controller. The industrial controller also generates internal diagnostic and status information indicative of a health of the controller itself, as well as its associated I/O modules, remote I/O devices, etc. Similarly, motor drives may generate operational and status data relating to its associated motion system as well as its own internal diagnostics (e.g., motor speed, motor position, over- and under-current faults, over- and under-voltage faults, etc.).

Many external applications are designed to communicate with these industrial devices, retrieve selected subsets of the available data on the devices, and render this data on one or more custom displays. Some such applications may also allow the user to view and modify selected device configuration parameters or setpoint values maintained on the industrial devices. Example applications that allow a user to view and/or modify data available on the industrial devices include, but are not limited to, industrial controller programming applications (e.g., ladder logic program development applications), human-machine interfaces (HMIs) that render selected items of device data on one or more customized graphical interface screens, reporting applications that import selected data from the industrial devices into custom reports, data collection or historian applications that archive selected data items, enterprise resource planning (ERP) applications, manufacturing execution system (MES) applications, or other such applications.

FIG. 1 is a diagram of an example industrial control environment in which a client device 102 executes a client application 104 that communicates with one or more industrial devices 114. In this example architecture, industrial devices 114—e.g., industrial controllers, motor drives, HMI terminals, etc.—are deployed within an industrial environment such as a plant facility and connected to a plant network 112. The plant network 112 may be any suitable wired or wireless network, including but not limited to Ethernet, DH/DH+, Remote I/O, Fieldbus, Modbus, Profibus, CAN, near field communication (NFC), Bluetooth, or a control and information protocol (CIP) network such as DeviceNet, ControlNet, or Ethernet/IP. Although FIG. 1 depicts industrial devices 114 communicating with client device 102 over a common plant network 112, in some scenarios client device 102 may be connected to a single industrial device over a dedicated point-to-point cable, such as a serial cable, a universal serial bus (USB) cable, or other type of cable.

Client device 102 executes client application 104, which is configured to retrieve and display selected subsets of device data available on the industrial devices 114. Client device 102 can be any mobile device (e.g., mobile phone, laptop computer, tablet computer, wearable computer, etc.) or fixed location computer (e.g., desktop computer, server, operator interface, etc.) capable of communicatively connecting to plant network 112. Client application 104 may be, for example, an industrial controller programming application that allows the client device 102 to view and modify the control program (e.g., ladder logic, sequential function chart, function block diagram, etc.) executing on an industrial controller, an HMI application or other visualization application that renders selected sets of industrial device data on one or more graphical display screens, a device configuration application, a reporting application configured to generate custom reports based on selected sets of industrial device data, a data collection or historian application, or other such application.

In order to communicatively interface the client application 104 with the industrial devices 114, a communications application 106 is installed on the client device 102. Communications application 106 acts as a data server or middleware application that facilitates data exchange between client application 104 and each industrial device 114. For each industrial device 114 with which client application 104 needs to communicate, communications application 106 must be configured to recognize the communication hardware and protocol associated with that device. If a given industrial device is configured with multiple different communication options (e.g., serial, USB, Ethernet, Bluetooth etc.), the communications application 106 must be configured to use the particular communication channel over which client application 104 will exchange data with the device. The communications application 106 can also allow the user to configure other communication settings—e.g., baud rate, flow control, etc.—for each industrial device to match the hardware and communication settings of the client device 102 and client application 104. Once configured for communication with one or more industrial devices 114, communications application 106 manages data communications between client device 102 and the industrial devices 114. That is, client application 104 can retrieve device data 110 from the industrial devices 114 via communications application 106, and can write configuration data 116 or other information to the industrial devices 114 via communications application 106

Although communications application 106 is depicted in FIG. 1 as being installed on the same client device 102 as client application 104, in some configurations communications application 106 may reside on a central computing device, such as a server or other type of computing device, that is separate from client device 102 and which is connected to plant network 112. In such architectures, client application 104 executing on client device 102 will access the industrial devices via the central computing device.

Figure 2:
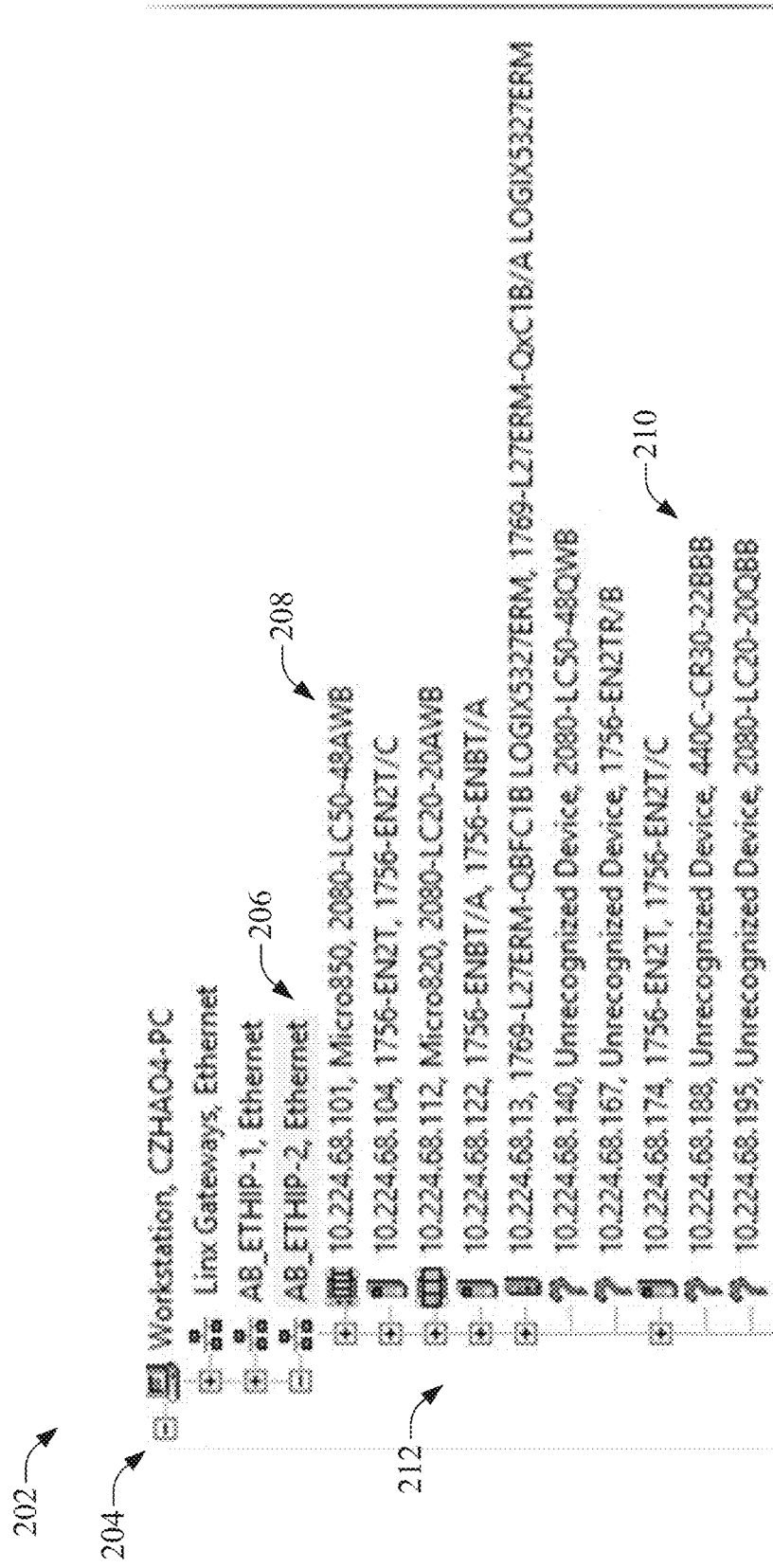
FIG. 2 is an example device topology tree that can be invoked and displayed by a communications application.

Some versions of communications application 106 allow the user to configure the communication settings (and, in some cases, other device configuration settings) for the respective industrial devices via interaction with a device topology tree. FIG. 2 is an example device topology tree 202 that can be invoked and displayed by communications application 106. In this example, the communications application 106 is installed on a workstation, represented by the workstation icon 204 at the top of the topology tree 202. Immediately below the workstation icon 204, three Ethernet nodes are configured, the third of which—represented by Ethernet node icon 206—has been selected for expansion. Expanding the Ethernet node icon 206 causes the devices connected to the selected Ethernet node to be displayed as device icons 212 under the Ethernet node icon 206. These device icons 212 represent the devices detected by the communications application 106 as being communicatively connected to the selected Ethernet node.

In order for communications application 106 to recognize a connected device, a device description file specific to the device must be registered within communications application 106. Returning briefly to FIG. 1, communications application 106 is shown as including a number of registered device description files 108 for a respective number of industrial devices. In the examples illustrated herein, the device description files 108 are labeled as being electronic data sheet (EDS) files. However, the systems and methods described herein are suitable for use with any type or format of device description file. The device description files 108 comprise device definition information that can be read and interpreted by the communications application 106, including but not limited to a device name and/or model, version information, vendor information, communication configuration settings or other device configuration settings, a graphical icon to be used to represent the device in the topology tree, etc. Once the device description file for a given industrial device is registered with the communications application 106, the communications application 106 is able to render one or more of a predefined graphical icon for the device; human-readable name, model, and software/firmware version information for the device; configurable communication or devices settings for the device that can be viewed and modified via the communications software; or other such information. Configuration settings for a selected industrial device can be viewed and modified by interacting with the selected device (e.g., by right-clicking or double-clicking on the device in the topology tree). The registered device description file can also provide the communications application with attributes that enable the communications application to interact or communicate with the industrial device, and may also contain security-related information (e.g., a validation key that permits communication with the industrial device).

Returning to FIG. 2, example topology tree 202 includes a number of recognized devices for which device description files have been registered (such as recognized device 208), as well as a number of unrecognized devices which have been detected by the communications application 106, but for which device description files have not yet been registered (such as unrecognized device 210). Unrecognized devices may be represented by a minimal amount of information, such as the device's internet protocol (IP) address, but more specific information about the device (e.g., model and vendor information, available configuration settings, etc.) may not be available until the device description file for the device is registered. In this example, before an industrial device can be recognized, the user must manually install the device description file for the device on the client device 102, thereby allowing the communications application 106 to recognize and communicate with the device. This process typically requires the user to obtain the device description file by downloading the file from a website associated with the device vendor, or to install the file from a disk or other storage medium that was provided with the industrial device.

In order to simplify and substantially automate the process of installing a device description file for an industrial device, one or more embodiments described herein provide a communications application capable of detecting and retrieving a device description file for an industrial device from the industrial device itself. To this end, a communications application (e.g., a data server or other type of middleware communication application) includes an automated device description uploading system that scans the topology of devices detected by the communications application and identifies any unknown devices for which a device description file has not been registered. In response to detecting an unknown device connected to the communications application, the automated device description file uploading system communicates to the unknown device to determine if the device has a device description file stored on its memory (e.g., as part of the device's firmware, or stored in a dedicated memory area). If the uploading system detects the presence of a device description file on the device, the system initiates an upload of the device description file from the unknown industrial device to the client device on which the communications application is installed. The uploaded device description file is then registered on the client device for use by the communications application. The device topology tree rendered by the communications application is then updated to reflect the device information defined in the device description file.

Figure 3:
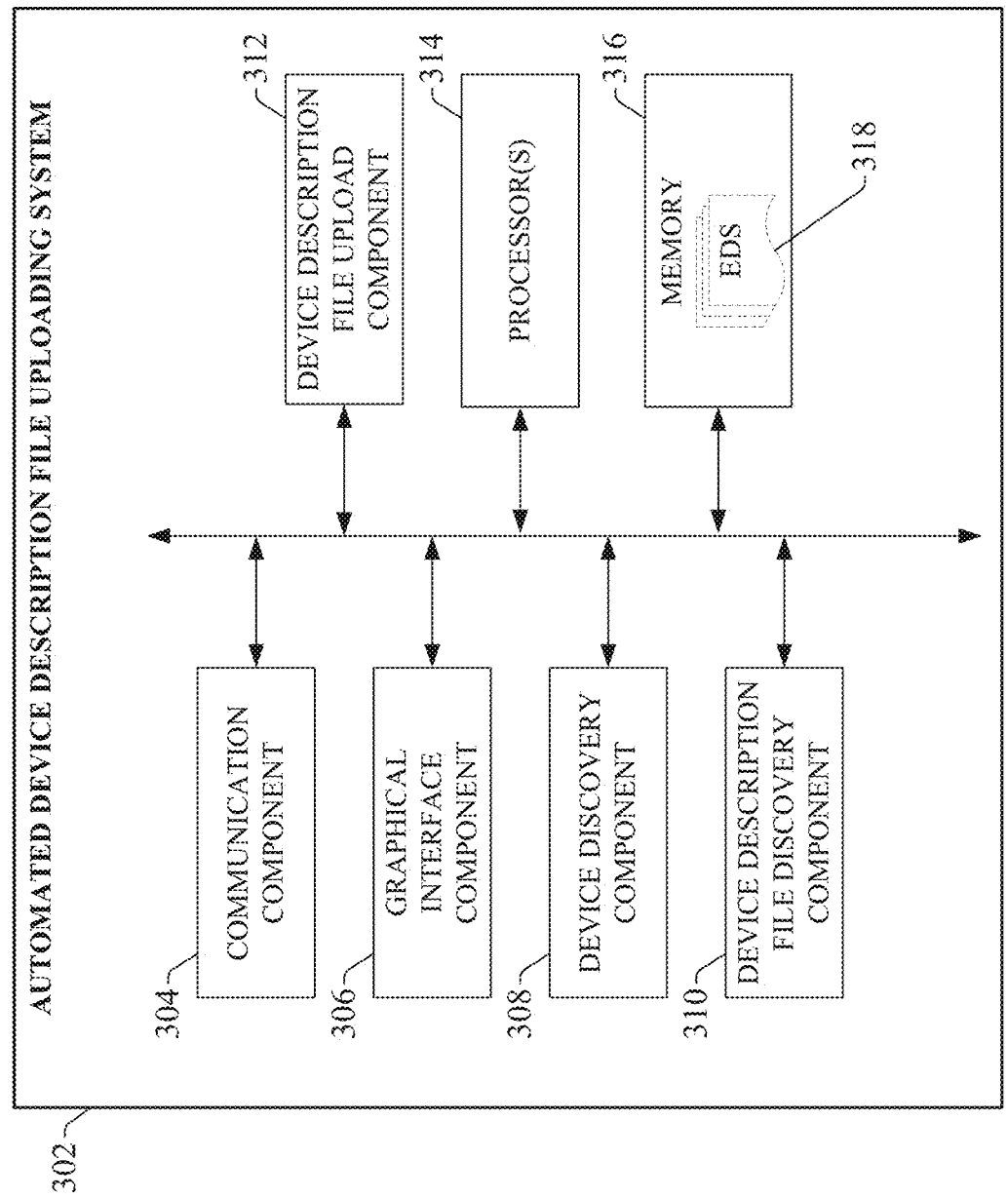
FIG. 3 is a block diagram of an example automated device description file uploading system.

FIG. 3 is a block diagram of an example automated device description file uploading system 302 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Automated device description file uploading system 302 can include a communication component 304, a graphical interface component 306, a device discovery component 308, a device description file discovery component 310, a device description file upload component 312, one or more processors 314, and memory 316. In various embodiments, one or more of the communication component 304, graphical interface component 306, device discovery component 308, device description file discovery component 310, device description file upload component 312, the one or more processors 314, and memory 316 can be electrically and/or communicatively coupled to one another to perform one or more of the functions of the automated device description file uploading system 302. In some embodiments, components 304, 306, 308, 310, and 312 can comprise software instructions stored on memory 316 and executed by processor(s) 314. Automated device description file uploading system 302 may also interact with other hardware and/or software components not depicted in FIG. 3. For example, processor(s) 314 may interact with one or more external user interface devices, such as a keyboard, a mouse, a display monitor, a touchscreen, or other such interface devices.

Communication component 304 can be configured to exchange data with one or more industrial devices (e.g., industrial devices 114), as well as to manage data exchanges between the industrial devices and a client-side application executing on a client device (e.g., a common client device on which system 302 is installed). In various embodiments, communication component 304 can be configured to send and receive data over one or more different communication protocols, including but not limited to wired networks (e.g., Ethernet networks, CIP networks, etc.), point-to-point cable connections (e.g., serial, USB, etc.), or wireless networks (e.g., WiFi, near field communication networks, etc.).

Graphical interface component 306 can be configured to generate one or more interface displays that render information relating to the industrial devices detected by the communication component 304. In one or more embodiments, graphical interface component 306 can render the device information in the form of a device topology tree that presents a hierarchical view of the devices detected by the communication component 304, segregated according to the communication channel or gateway to which the devices are connected. The interface displays rendered by the graphical interface component 306 can also provide a means for a user to view and modify one or more communication or device configuration settings for selected devices.

The device discovery component 308 can be configured to scan one or more communication channels opened by the communication component 304 and detect the presence of industrial devices on those channels. For discovered devices for which a device description file is registered in the memory 314, the device discovery component 308 will match the discovered device with its registered device description file, facilitating communication between the client device and the device, and allowing the graphical interface component 306 to present complete information about the device via the topology tree (or other suitable device presentation). For discovered devices for which a device description file has not yet been registered, the device discovery component 308 will inform device description file discovery component 310 that a device description file has not been registered for the device, and instruct the graphical interface component 306 to render the device generically as an unknown device.

The device description file discovery component 310 can be configured to poll a discovered industrial device for presence of a device description file on the device's memory. The device description file upload component 312 can be configured to initiate an upload of the device description file from the industrial device to the client device on which the system 302 is installed, and to register the uploaded device description file on the client device.

The one or more processors 314 can perform one or more of the functions described herein with reference to the systems and/or methods disclosed. Memory 316 can be a computer-readable storage medium storing computer-executable instructions and/or information for performing the functions described herein with reference to the systems and/or methods disclosed. Memory 316 can also store the registered device description files 318, including both manually installed device description files as well as device description files that are automatically retrieved by the device description file upload component 312.

Figure 4:
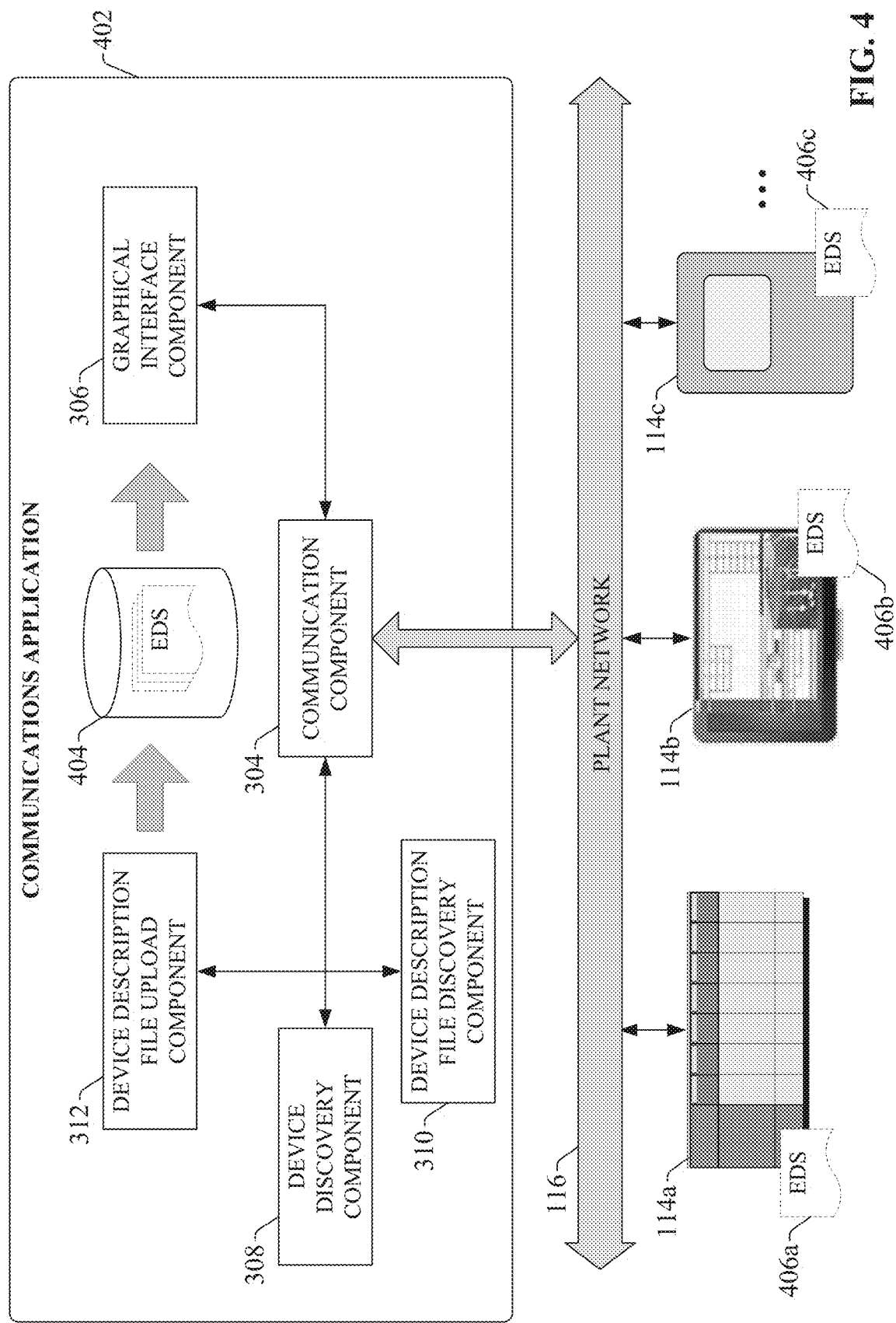
FIG. 4 is a diagram illustrating the components of an automated device description file uploading system incorporated in a communications application configured to act as a data server between industrial devices and a client application executing on a client device.

FIG. 4 is a diagram illustrating the components of automated device description file uploading system incorporated in a communications application 402 configured to act as a data server between industrial devices 114 and a client application executing on a client device (not shown). Similar to the communications application 106 of FIG. 1, communications application 402 can render information about the devices 114 discovered on plant network 112; e.g., as a device topology tree similar to topology tree 202. Communication component 304 manages data exchanges between the client device and industrial devices 114 via one or more configured communication channels. Available communication channels over which devices 114 can communicate with the communication component 304 are partly a function of the communication ports or channels available on the client device on which communications application 402 is installed (e.g., Ethernet ports, near field communication channels, wireless data ports, USB ports, serial ports etc.).

When communication component 304 opens one or more communication channels, device discovery component 308 scans for the presence of any industrial devices connected to the respective communication channels (e.g., industrial controllers, I/O modules connected to the industrial controllers, motor drives, HMI terminals, etc.). If an industrial device is detected on one of the communication channels, the device discovery component 308 determines whether a device description file matching the discovered device is registered in a device description file storage area 404 of the client device. The device description file storage area 404 is managed by the communications application 402, which registers newly installed or uploaded device description files to the storage area 404, and retrieves the files as needed when a corresponding device is discovered. In one or more example embodiments, the device discovery component 308 can determine that a newly discovered industrial device 114 matches a registered device description file by comparing an identity code—and, in some embodiments, device and/or software revision information—associated with the device description file with a corresponding identity code read from the discovered device (e.g., a media access control address or other device identifier).

If a registered device description file matches the discovered industrial device, information contained in the matching device description file is used by the communication component 304 to exchange data with the discovered device. Moreover, graphical interface component 306 leverages information stored in the matching device description file to present information about the device via a graphical interface display; e.g., as an entry on a device topology tree or other suitable presentation format. For example, the device description file may define a graphical icon to be used to represent the device in the topology tree (to replace the generic icon used for unrecognized devices). In some embodiments, this icon may be a simple graphical representation of the device that facilitates easy recognition of the device type (e.g., controller, I/O module, drive, etc.). Alternatively, in some embodiments, the device description file may define a high-resolution image that represents the device and that comprises a format that allows the image to be imported into other systems for display and/or design purposes (e.g., system design and layout tools). The device description file may also define a name of the device, model and vendor information for the device, hardware and/or software version information for the device, security-related information for the device, or other such information. This device description file data can also define available communication and/or device configuration settings that can be viewed and/or modified via the communications application 402. These configuration settings may be different for each type of industrial device. In some embodiments, the device description file for a given device may instruct communication component 304 how to access these settings, as well as define the read/write privileges for each setting. This configuration information defined by the device description file is also used by the graphical interface component 306 to present the current values of these configuration settings, which may be invoked via interaction with the device icon in the topology tree. The graphical interface component 306 also allows the user to modify configuration settings for which write privileges are granted.

The device description file may also communicatively map the communications application to one or more data registers within the industrial device, allowing the communications application—and any client-side application that attempts to access these registers via the communications application—to read data from and write data to the mapped registers.

If the device discovery component 308 determines that no device description file has been registered for a discovered industrial device (that is, no device description file for the device is found in the device description file storage area 404), the device discovery component 308 instructs the device description discovery component 310 to poll the device to determine whether a device description file is stored on the industrial device itself. In some scenarios, the industrial device may store its corresponding device description file 406 as part of its firmware. However, the device description file 406 may also be stored separately from the device's firmware in a dedicated memory location. In the case of industrial controller 114a (e.g., a PLC or other type of controller), a device description file for the industrial controller itself may be installed on the controller's memory, while each I/O module installed on the controller's backplane may also have stored thereon a device description file the I/O module.

Figure 5:
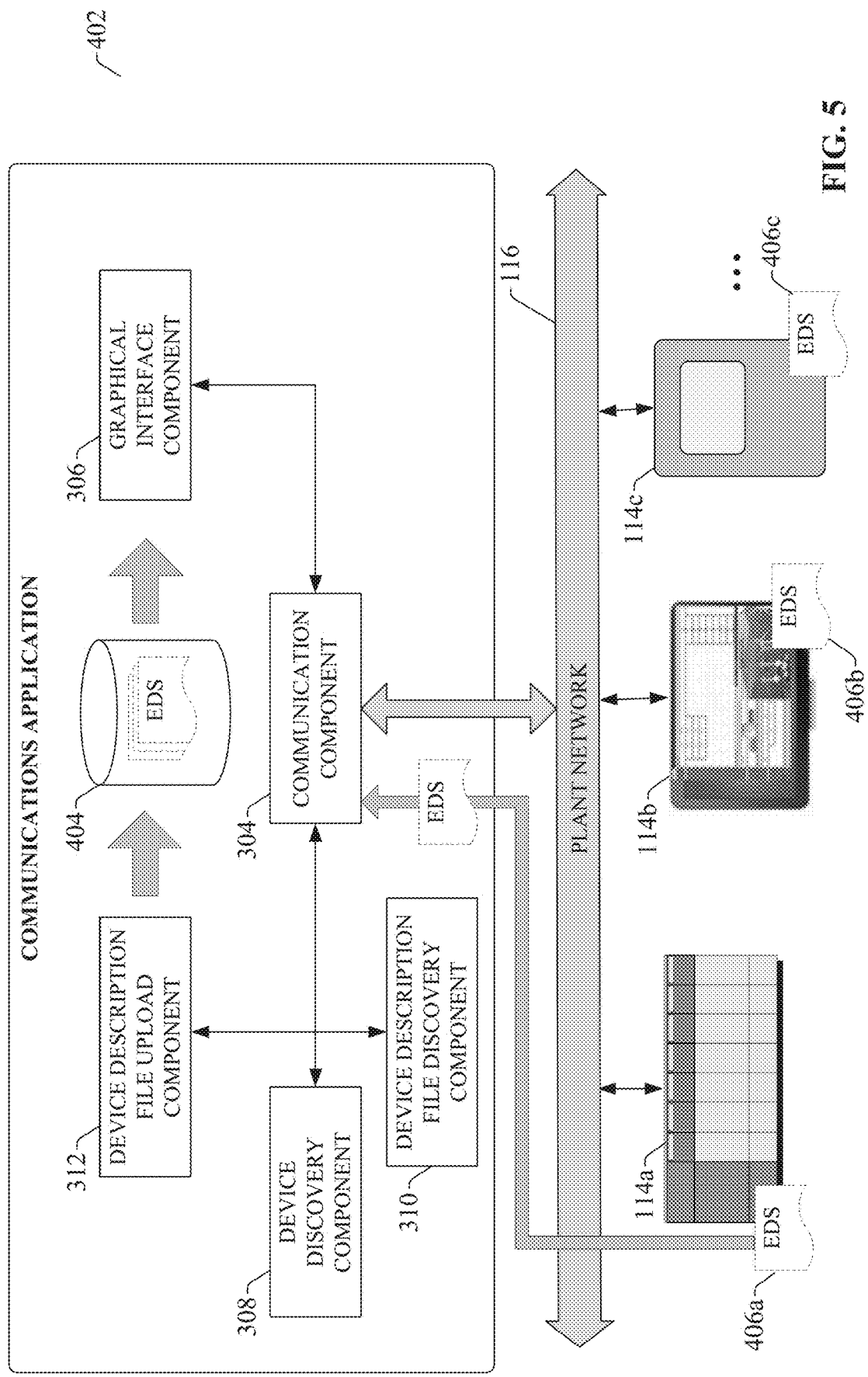
FIG. 5 is a diagram illustrating upload of a device description file from an industrial device by a communications application.

Device description file discovery component 310 sends a request for the device description file to the industrial device. In an example sequence, if the industrial device supports provision of its own device description file, the industrial device will respond to the request indicating that a device description file is available for upload from the device. As shown in FIG. 5, in response to receiving an affirmative response to the request, the device description file discovery component 310 instructs the device description file upload component 312 to initiate an upload of the device description file 502 from the industrial device to the client device on which the communications application 402 resides via communication component 304. Once uploaded, device description file upload component 312 registers the device description file in the device description file storage area 404 for use by the communication component 304 and the graphical interface component 306. If multiple unrecognized devices are discovered, the device description file upload component 312 may perform the file upload process sequentially for the respective devices in some embodiments. Alternatively, the device description file upload component 312 may perform simultaneous (e.g., parallel) uploading of the device description files for the unknown devices.

If an unrecognized industrial device does not support storage and provision of its own device description file, the industrial device may send a negative response in response to the request sent by the device description file discovery component 310, or may not respond to the request. If the device description file discovery component 310 does not receive a response from the unrecognized industrial device with a defined time-out period after sending the device description file request, the device description file discovery component 310 may initiate an appropriate handling routine. For example, in some embodiments, the device description file discovery component 310 will instruct the graphical interface component 306 to render a message indicating that a device description file for the newly discovered unknown device could not be found, and informing the user of possible steps for obtaining a device description file for the device (e.g., manually installing a device description file provided with the device, downloading the device description file from the device vendor's website, etc.).

Figure 6:
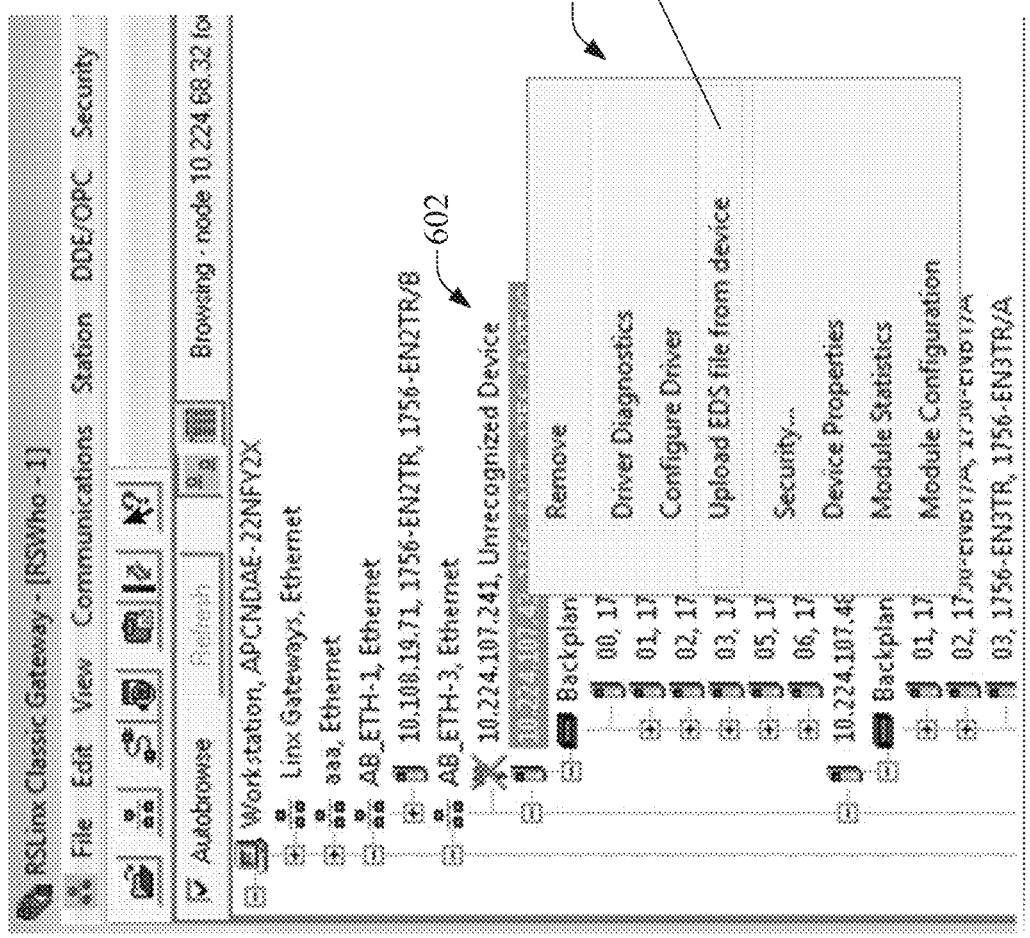
FIG. 6 is an example display interface that includes a menu option for manually initiating upload of a device description file.
Figure 7:
FIG. 7 is an example device topology tree that includes a progress bar indicating a status of a device description file upload.

In some embodiments, the communications application including automated device description file uploading system 302 may include configuration settings that disable automatic location and retrieval of a device description file residing on an unknown device, and enable manually triggered uploading of device description files from the device. FIG. 6 is an example display interface that includes a menu option for manually initiating upload of a device description file. In this example, an icon 602 corresponding to an unrecognized device discovered by device discovery component 308 has been selected, and an option menu 604 has been invoked by right-clicking or double-clocking on the device icon 602. The menu 604 includes an option 606 for initiate uploading of the device description file from the selected device. When this option is selected from menu 604, the device description file discovery component sends a request for the device description file to the selected device, as described above in connection with FIGS. 4 and 5. In this way, the device description file discovery and upload sequence is initiated manually rather than automatically in response to discovery of the unknown device by device discovery component 308. If a device description file is found on the device, the device description file upload component 312 will begin uploading the file. As shown in FIG. 7, the graphical interface component 306 can render a progress bar 702 near the unrecognized device icon showing the progress of the file upload. Upon completion of the upload, the device description file is registered and the topology tree is updated with the device information contained in the device description file.

In some embodiments, after a device description file for a given industrial device has been registered in the communications application 402, the device description file discovery component 310 can automatically poll the industrial device at defined times (e.g., periodically or according to a non-periodic polling schedule) in order to determine if a newer (or different) version of the device description file for the device is available. In an example scenario, a newer device description file may be discovered if the industrial device has been replaced with a newer version of the device, which may include an updated version of the device's device description file defining new device information (e.g., model information, firmware version, etc.) and/or new configuration setting options. If the device description file discovery component 310 discovers that the detected version of the device description file is newer than the current version, or is otherwise different than the current version (e.g., in a scenario in which a device is replaced with an older version), the device description file upload component 312 initiates upload and registration of the different version of the device description file.

Figure 8:
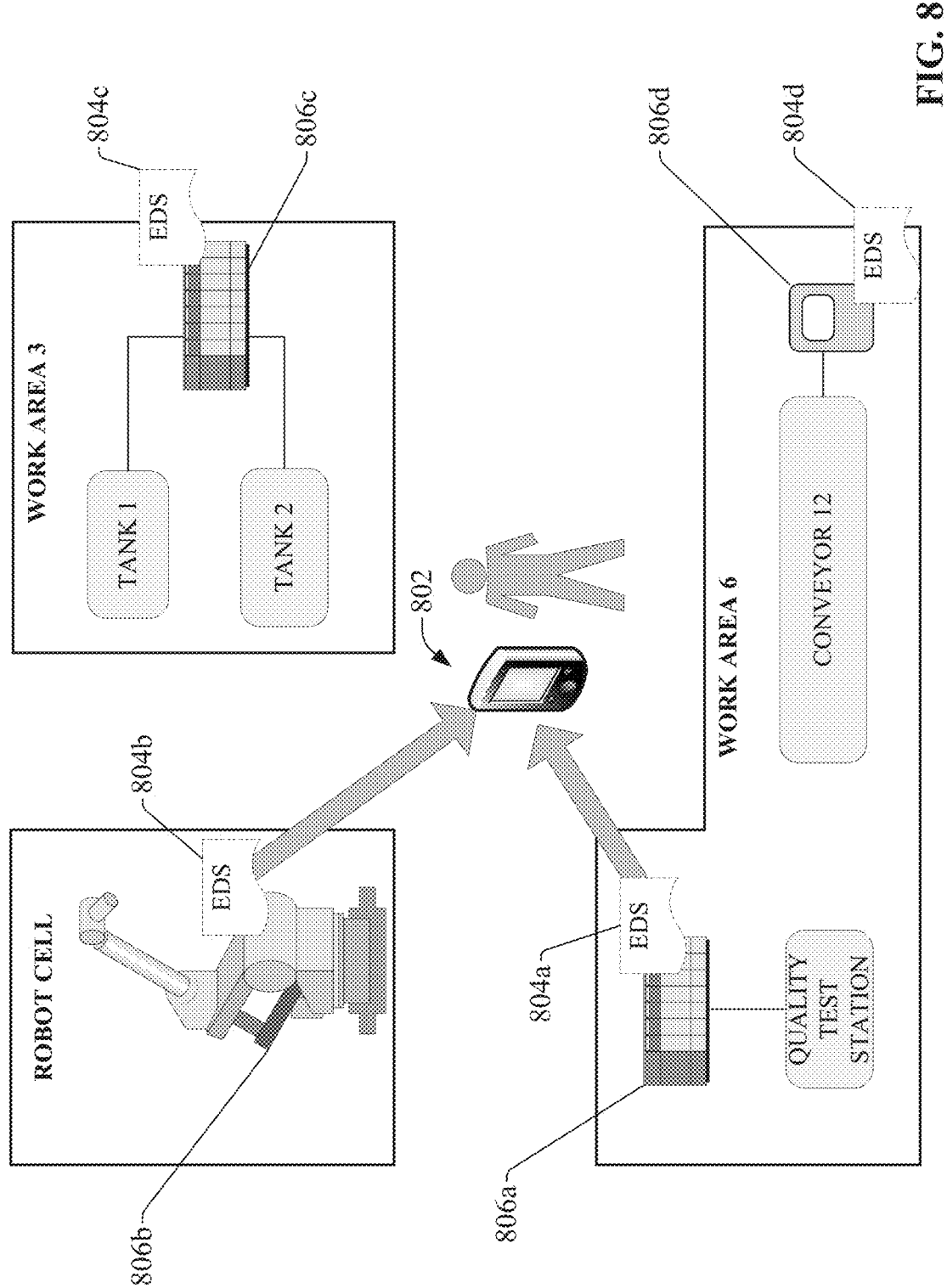
FIG. 8 is a diagram illustrating an example mobile visualization architecture that leverages automatic detection and registration of device description files from industrial devices.

The automated device description file discovery and uploading features described above can eliminate the need to manually locate, install, and register a device description file for a new industrial device to be added to a communication application's topology tree. These features can also offer a greater degree of flexibility in mobile applications. FIG. 8 is a diagram illustrating an example mobile architecture that leverages automatic detection and registration of device description files from industrial devices. In this example, the communications application 402—including the automatic device description file uploading system components described above—is installed on a mobile client device 802 (e.g., a mobile phone, a tablet computer, a wearable computer, etc.), which also executes a mobile application that uses the communications application 402 to access and retrieve data from industrial devices 806 deployed throughout a plant environment. The mobile application may be, for example, a mobile visualization application that renders graphical or alphanumeric representations of data ready from the industrial devices. However, other types of mobile applications capable of exchanging data with the industrial devices are also within the scope of one or more embodiments described herein. The communications application is configured to view the client device's wireless networking port (e.g., WiFi port, a near field communication port, etc.) as a communication node, and to scan for the presence of industrial devices 806 detected within the client device's near field communication range. When one or more devices are detected by the communications application, the mobile application retrieves selected subsets of data from those devices (via the communications application) for display on one or more customized display screens.

As the user traverses the plant with client device 802, the communications component may encounter new industrial devices that have not yet been registered in the communications application. In response to detecting such unrecognized devices, the device description file discovery component automatically sends a message to the unrecognized device requesting its device description file 804, if such a device description file is stored on the device. If a device description file is stored on the device, the device description file discovery component retrieves the device description file using the client device's near field communication capabilities, and registers the device description file in the communication application's device description file storage area, thereby allowing the mobile application to communicate with the device, and allowing the user to view and modify the device's communication or device configuration settings via the client device if desired.

As described above, available device configuration settings for a given industrial device (e.g., communication settings, device parameter settings, etc.) can be defined by the device's device description file. When registered, the device description file makes these available configuration settings accessible by the user via the communications application 402. In some embodiments, the communications application may also communicate these available configuration settings to the client application (e.g., client application 104) that uses the communications application to access the device, thereby making these configuration settings accessible via the client application. FIG. 9 is a diagram depicting communication of device configuration setting options from a communications application 906 to a client application executing on client device 902. In this example, the client application is an industrial controller programming application 910 used to view, edit, and download industrial control programs (e.g., ladder logic programs) to an industrial controller such as a PLC.

As described in previous example, the communications application 906 has uploaded and registered a device description file 904 for an industrial device, which in this case is an industrial controller (not shown) with which the programming application 910 will communicate for the purposes of configuration and programming. The device description file defines a number of available communication settings and device configuration settings that can be modified by a user, including but not limited to a communication baud rate, flow control settings, programming mode setting, I/O module definitions, and other such settings. Once the device description file is registered, the communications application 906 makes these settings accessible to view and modify via interaction with the device topology tree (or other suitable device presentation).

In addition, the communications application 906 can communicate these configuration setting options 908 to the programming application 910, which likewise makes these configuration settings accessible to the user (e.g., by displaying a similar device topology tree to that rendered by the communications application 906). This can allow the user to access, view, and modify the device settings via the programming application 910, mitigating the need for the user to invoke the communications application 906 directly in order to access these settings.

Figure 10A:
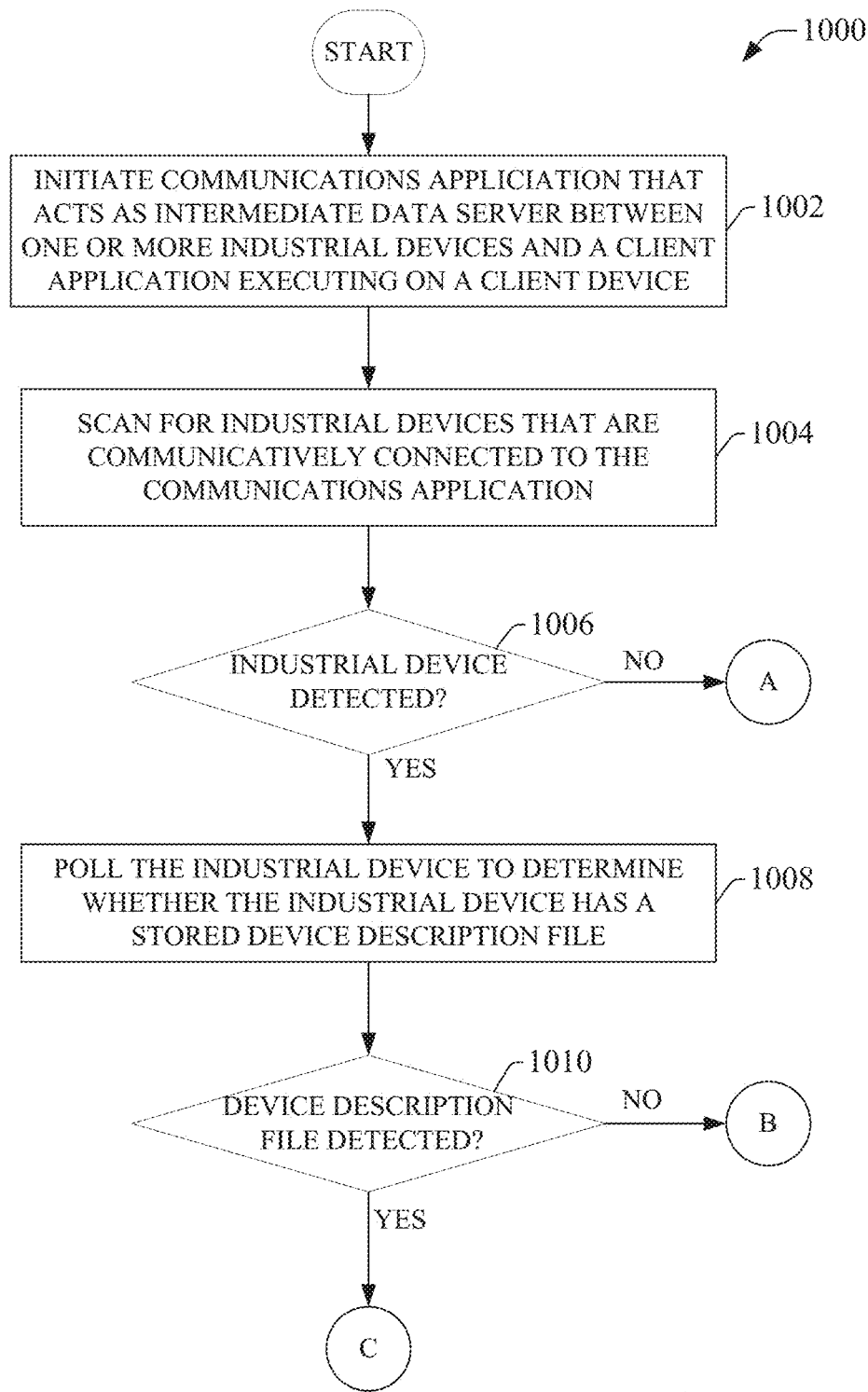
FIGS. 10A and 10B are flowcharts of an example methodology for automatically detecting and uploading a device description file for an industrial device to a communications application that serves as a data server between the industrial device and a client-side application.
Figure 10B:
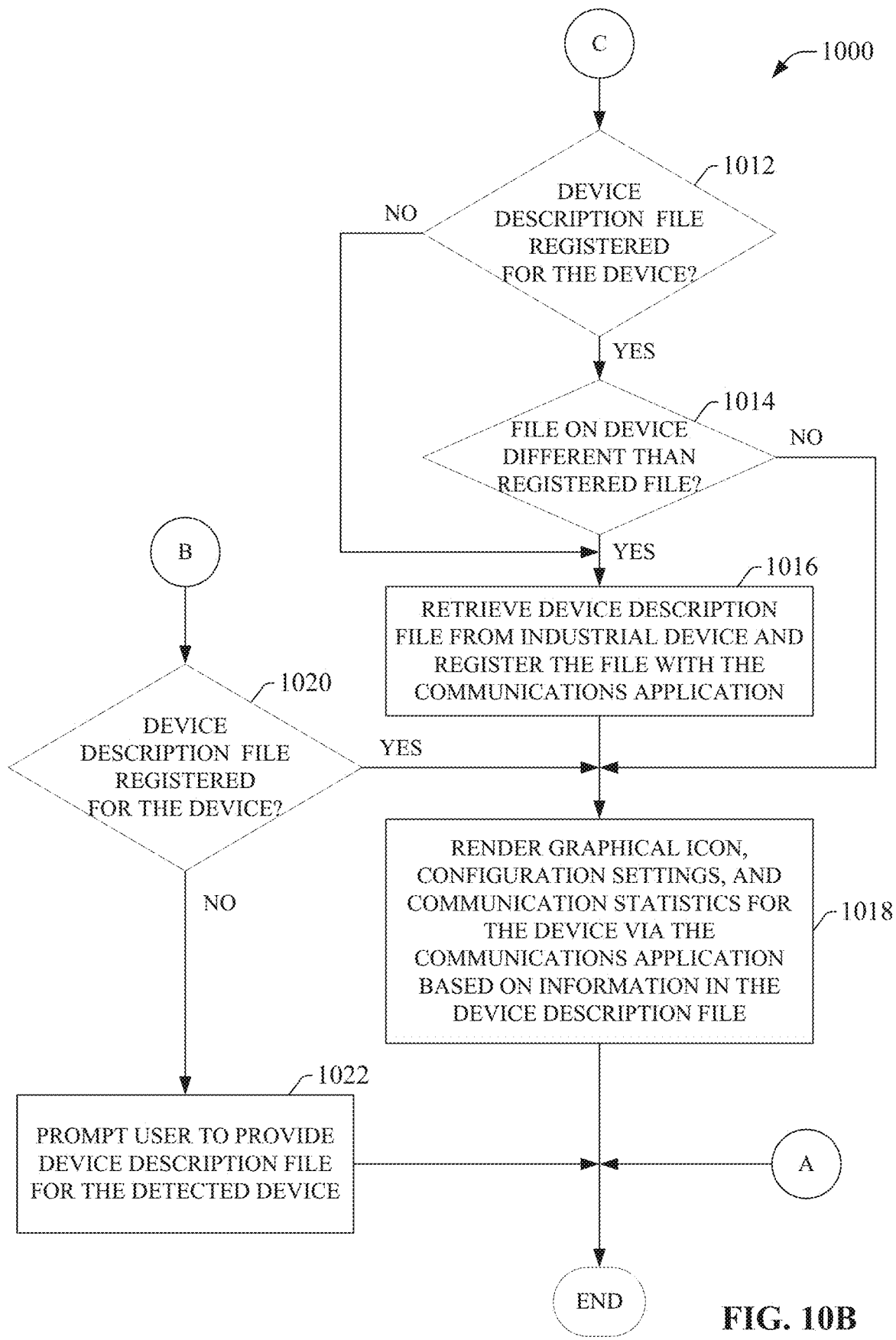

FIGS. 10A-10B illustrate an example methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIGS. 10A and 10B are two parts of an example methodology 1000 for automatically detecting and uploading a device description file for an industrial device to a communications application that serves as a data server between the industrial device and a client-side application. Initially, at 1002, a communications application is initiated, where the communications application acts as an intermediate data server between one or more industrial devices and a client application. At 1004, the communications application scans for industrial devices that are communicatively connected to the communications application. This scan may be performed, for example, via a communication port of the client device (e.g., a wired or wireless network port, a near field communication port, a data cable port, etc.).

At 1006, a determination is made regarding whether an industrial device is detected. If no industrial device is detected (NO at step 1006), the methodology ends as shown in FIG. 10B. Alternatively, if an industrial device is detected (YES at step 1006), the methodology moves to step 1008, where the industrial device is polled by the communications application to determine whether the device has a stored device description file. At 1010 a determination is made regarding whether a device description file is detected in response to the polling performed at step 1008. If no device description file is detected on the device (NO at step 1010), the methodology moves to step 1020 of FIG. 10B, where a determination is made regarding whether a device description file is registered for the device in the communications application. If a device description file for the discovered device is already registered (YES at step 1020), the methodology moves to step 1018, where a graphical icon, available configuration settings, and communication statistics for the industrial device are rendered via the communications application based on information in the device description file. Alternatively, if no device description file for the device is registered (NO at step 1020), the methodology moves to step 1022, where the user is prompted to provide the device description file for the detected device. In some embodiments, this prompt may instruct the user to retrieve the device description file from the device vendor's website, or to manually install a device description file provided with the device Returning to step 1010, if a device description file is detected on the device (YES at step 1010), the methodology moves to step 1012 of FIG. 10B, where a determination is made regarding whether a device description file is registered for the device in the communications application (similar to the determination made at step 1020). If a device description file is registered for the device (YES at step 1012), the methodology moves to step 1014, here a determination is made regarding whether the device description file stored on the industrial device is different than the file registered in the communications application for the device. For example, the file stored on the device may be an updated version of the device description file for the device, and will therefore be detected as a different version than that registered in the communications software.

If it is determined that the file stored on the industrial device is different than the file registered for the device in the communications application (YES at step 1014), the methodology performs steps 1016 and 1018, sequentially, as described above. That is, the device description file stored on the industrial device is retrieved from the device, registered with the communications application, and used to render a graphical icon, configuration settings, and communication statistics for the device. Alternatively, if it is determined that the file stored on the device is not different than the file registered for the device in the communications application (NO at step 1014), the methodology skips the retrieval performed at step 1016.

Returning to step 1012, if no device description file is registered for the device (NO at step 1012), the methodology skips the determination made at step 1014.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 11:
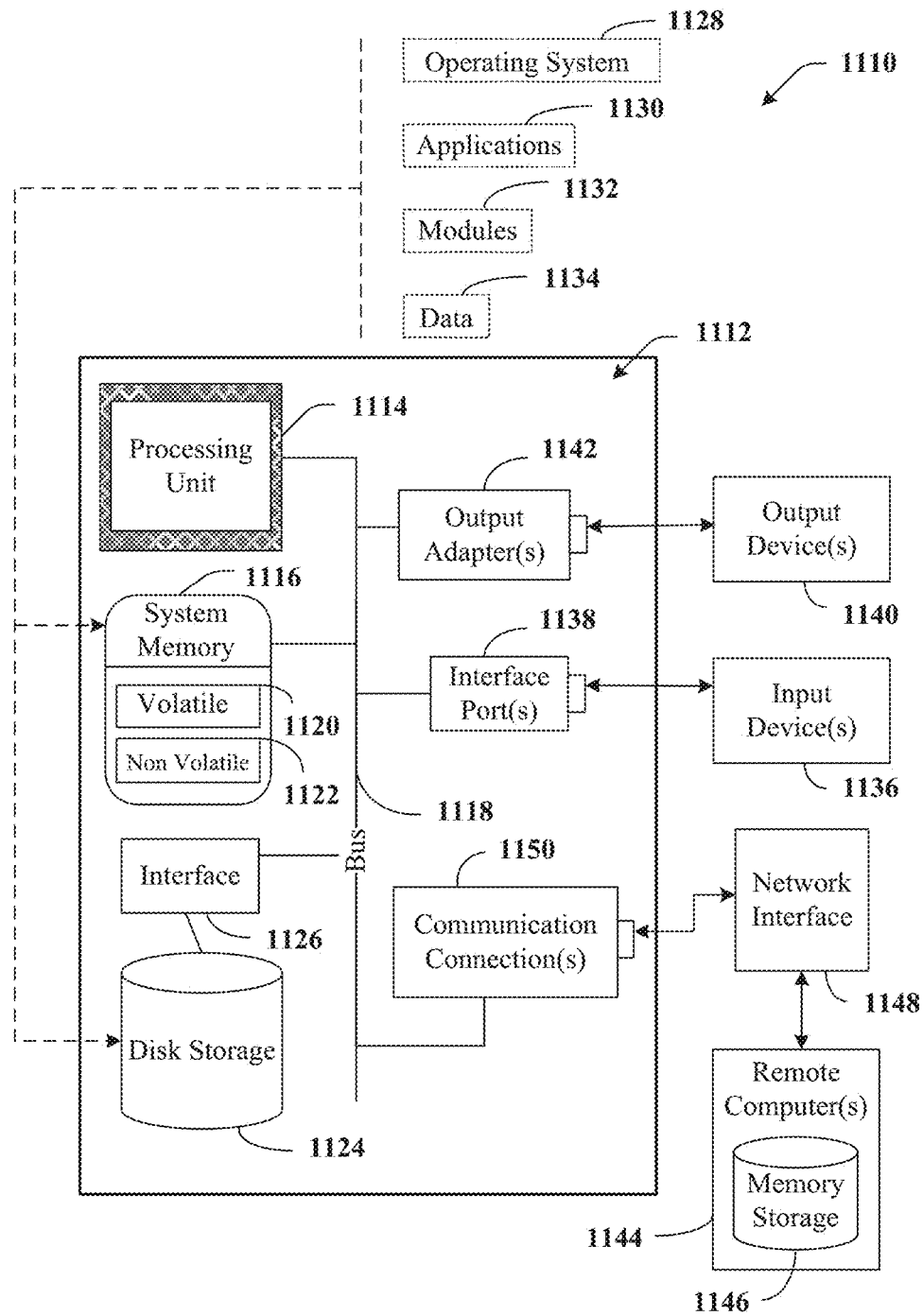
FIG. 11 is an example computing environment.
Figure 12:
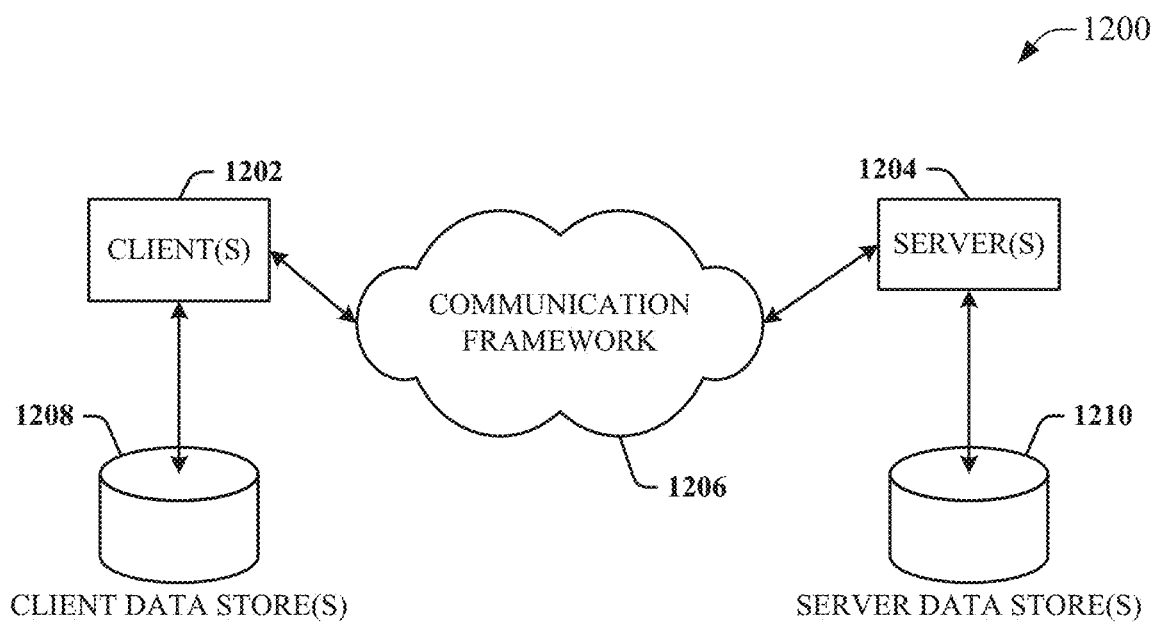
FIG. 12 is an example networking environment.

In order to provide a context for the various aspects of the disclosed subject matter, FIGS. 11 and 12 as well as the following discussion are intended to provide a brief, general description of a suitable environment in which the various aspects of the disclosed subject matter may be implemented.

With reference to FIG. 11, an example environment 1110 for implementing various aspects of the aforementioned subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Multi-core microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable PROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer 1112. System applications 1130 take advantage of the management of resources by operating system 1128 through program modules 1132 and program data 1134 stored either in system memory 1116 or on disk storage 1124. It is to be appreciated that one or more embodiments of the subject disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapters 1142 are provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (PDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 1148 can also encompass near field communication (NFC) or Bluetooth communication.

Communication connection(s) 1150 refers to the hardware/software employed to connect the network interface 1148 to the system bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample computing environment 1200 with which the disclosed subject matter can interact. The sample computing environment 1200 includes one or more client(s) 1202. The client(s) 1202 can be hardware and/or software (e.g., threads, processes, computing devices). The sample computing environment 1200 also includes one or more server(s) 1204. The server(s) 1204 can also be hardware and/or software (e.g., threads, processes, computing devices). The servers 1204 can house threads to perform transformations by employing one or more embodiments as described herein, for example. One possible communication between a client 1202 and servers 1204 can be in the form of a data packet adapted to be transmitted between two or more computer processes. The sample computing environment 1200 includes a communication framework 1206 that can be employed to facilitate communications between the client(s) 1202 and the server(s) 1204. The client(s) 1202 are operably connected to one or more client data store(s) 1208 that can be employed to store information local to the client(s) 1202. Similarly, the server(s) 1204 are operably connected to one or more server data store(s) 1210 that can be employed to store information local to the servers 1204.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A mobile client device, comprising:
   a wireless networking port;
   a memory that stores executable components; and
   a processor, operatively coupled to the memory, that executes the executable components, the executable components comprising:
      a communication component configured to monitor the wireless networking port for presence of an industrial device within a communication range of the wireless networking port;
      a device discovery component configured to, in response to a determination by the communication component that the industrial device is within the communication range, determine whether a device description file for the industrial device has been registered with the mobile client device;
      a device description file discovery component configured to determine whether the device description file is stored on the industrial device;
      a device description file upload component configured to, in response to a determination that the device description file is stored on the industrial device and has not been registered with the mobile client device, initiate an upload of the device description file from the industrial device via the wireless networking port, wherein the device description file comprises at least a device name of the industrial device, a device configuration parameter of the industrial device, and a graphical icon representing the industrial device; and
      a graphical interface component configured to render, based on information contained in the device description file, the graphical icon and the device name as part of a device topology tree, the device topology tree comprising hierarchically arranged icons representing industrial devices, including the industrial device, discovered by the device discovery component,
   wherein
      the device description file discovery component is further configured to periodically poll the industrial device for presence of a different version of the device description file subsequent to uploading of the device description file from the industrial device, and
      the device description file upload component is further configured to, in response to detection of the different version of the device description file by the device description discovery component, initiate an upload of the different version of the device description file from the industrial device via the wireless networking port.

2. The mobile client device of claim 1, wherein the graphical interface component is further configured to render, as part of the device topology tree, at least one of a device configuration parameter for the industrial device or a communication setting for the industrial device based on the information contained in the device description file.

3. The mobile client device of claim 1, wherein the industrial device comprises at least one of an industrial controller, an I/O module, a motor drive, a human-machine interface terminal, a telemetry device, a meter, an industrial robot controller, a vision system, a barcode reader, a presence sensing camera, an I/O sensor, instrument, or an output control device.

4. The mobile client device of claim 1, wherein the graphical interface component is further configured to render a prompt to manually install the device description file for the industrial device in response to a determination by the device description file discovery component that the device description file is not located on the industrial device.

5. The mobile client device of claim 1, wherein the communication component is further configured to manage data exchange between the industrial device and a client application based on device communication settings defined by the device description file.

6. The mobile client device of claim 5, wherein the client application comprises at least one of an industrial controller programming application, a data visualization application, a reporting application, or a data collection application.

7. The mobile client device of claim 2, wherein the communication component is further configured to export at least one of the device name for the industrial device, the device configuration parameter for the industrial device, or the communication setting for the industrial device to a client application that exchanges data with the industrial device via the mobile client device.

8. The mobile client device of claim 1, wherein the device description file upload component is configured to initiate the upload of the device description file automatically.

9. The mobile client device of claim 1, wherein the device description file upload component is further configured to, in response to a determination that a previously registered device description file has been registered with the mobile client device and that the device description file stored on the industrial device is different than the previously registered device description file, initiate the upload of the device description file from the industrial device via the communication port.

10. The mobile client device of claim 1, wherein the mobile client device is at least one of a tablet computing device a mobile phone, or a wearable computing device.

11. The mobile client device of claim 1, wherein the device description file further comprises a validation key that permits the mobile client device to communicate with the industrial device.

12. The mobile client device of claim 1, wherein the device topology tree comprises hierarchically arranged nodes comprising at least a workstation node representing the mobile client device, a network node representing a network device, and device nodes representing industrial devices connected to the network device.

13. A method, comprising:
   detecting, by a mobile client device comprising at least one processor, that an industrial device is within a wireless communication range of a wireless communication port of the mobile client device;
   determining, by the mobile client device and in response to the detecting, that a device description file for the industrial device is not registered with the mobile client device;
   sending, by the mobile client device and in response to the determining, a request to the industrial device via the wireless communication port for the device description file;
   initiating, by the mobile client device, an upload of the device description file from the industrial device via the wireless communication port in response to receipt of a confirmation from the industrial device that the device description file is stored on the industrial device, wherein the device description file defines at least a device name of the industrial device, a device configuration parameter of the industrial device, and a graphical icon representing the industrial device;

rendering, by the mobile client device based on information contained in the device description file, the graphical icon and the device name in a device topology tree, wherein the device topology tree comprises hierarchically organized icons representing industrial devices, including the industrial device, that are communicatively connected to a communication port;

periodically polling, by the mobile client device subsequent to the initiating the upload, the industrial device for presence of a different version of the device description file; and in response to detecting the different version of the device description file based on the poling, initiating an upload of the different version of the device description file from the industrial device via the wireless communication port.

14. The method of claim 13, further comprising rendering, by the mobile client device on the device topology tree, at least one of a device configuration parameter for the industrial device or a communication setting for the industrial device based on the information contained in the device description file.

15. The method of claim 13, wherein the detecting comprise detecting, as the industrial device, at least one of an industrial controller, an I/O module, a motor drive, a human-machine interface terminal, a telemetry device, a meter, an industrial robot controller, a vision system, a barcode reader, a presence sensing camera, an I/O sensor, instrument, or an output control device.

16. The method of claim 13, further comprising rendering, by the mobile client device, a prompt to manually install the device description file for the industrial device in response to determining that the device description file is not stored on the industrial device.

17. The method of claim 13, further comprising exchanging, by the mobile client device, data between the industrial device and a client application executing on the mobile client device based on device communication settings defined by the device description file, the client application comprising at least one of an industrial controller programming application, a data visualization application, a reporting application, or a data collection application.

18. The method of claim 14, further comprising exporting, by the mobile client device, at least one of the device name for the industrial device, the device configuration parameter for the industrial device, or the communication setting for the industrial device to a client application that exchanges data with the industrial device via the mobile client device.

19. The method of claim 13, further comprising permitting, by the system, communication with the industrial device based on a validation key contained in the device description file.

20. The method of claim 13, wherein the rendering comprises rendering the device topology tree as a set of hierarchically organized icons comprising at least a workstation icon representing the system, a network icon representing a network device, and device icons, including the graphical icon, representing industrial devices connected to the network device.

21. A non-transitory computer-readable medium having stored thereon instructions that, in response to execution, cause a mobile client device comprising a processor to perform operations, the operations comprising:

detecting that an industrial device is within a communication range of a wireless communication port of the mobile client device;

in response to the detecting, determining whether device description information for the industrial device is registered with the mobile client device;

in response to determining that the device description information is not registered with the mobile client device:

sending a request for the device description information to the industrial device via the wireless communication port, and initiating an upload of the device description information from the industrial device via the communication port in response to receiving a message from the industrial device that the device description information is stored on the industrial device, wherein the device description information comprises at least a device name of the industrial device, a device configuration parameter of the industrial device, and a graphical icon representing the industrial device;

rendering, based on the device description information, a device topology tree that includes the graphical icon and the device name, the device topology tree comprising hierarchically arranged icons representing industrial devices, including the industrial device, that are communicatively connected to the communication port;

polling the industrial device periodically for presence of a different version of the device description file subsequent to the initiating the upload, and in response to detecting the different version of the device description file based on the polling, initiating an upload of the different version of the device description file from the industrial device via the communication port.

22. The non-transitory computer-readable medium of claim 21, further comprising rendering, on the device topology tree, at least one of a device configuration parameter for the industrial device or a communication setting for the industrial device based on the device description information.

23. The non-transitory computer-readable medium of claim 21, wherein the detecting comprise detecting, as the industrial device, at least one of an industrial controller, an I/O module, a motor drive, a human-machine interface terminal, a telemetry device, a meter, an industrial robot controller, a vision system, a barcode reader, a presence sensing camera, an I/O sensor, instrument, or an output control device.

* * * * *